(12) United States Patent
Yamamoto et al.

(10) Patent No.: US 10,899,076 B2
(45) Date of Patent: Jan. 26, 2021

(54) THREE-DIMENSIONAL PRINTING METHOD, THREE-DIMENSIONAL PRINTING APPARATUS, AND THREE-DIMENSIONAL MODELED OBJECT

(71) Applicant: HONDA MOTOR CO., LTD., Tokyo (JP)

(72) Inventors: Daisuke Yamamoto, Tochigi-ken (JP); Haruka Ito, Tochigi-ken (JP); Shunichi Yorozuya, Tochigi-ken (JP); Yui Miyazaki, Tochigi-ken (JP); Fumitomo Takano, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 70 days.

(21) Appl. No.: 15/904,580

(22) Filed: Feb. 26, 2018

(65) Prior Publication Data

US 2018/0250879 A1    Sep. 6, 2018

(30) Foreign Application Priority Data

Mar. 1, 2017    (JP) .................................. 2017-037882

(51) Int. Cl.
*B29C 64/20*    (2017.01)
*B29C 64/209*    (2017.01)
(Continued)

(52) U.S. Cl.
CPC .......... *B29C 64/209* (2017.08); *B29C 64/118* (2017.08); *B29C 64/295* (2017.08);
(Continued)

(58) Field of Classification Search
CPC ... B29C 64/209; B29C 64/295; B29C 64/118; B33Y 30/00; B33Y 70/00; B33Y 10/00
See application file for complete search history.

(56) References Cited

U.S. PATENT DOCUMENTS 9,433,969 B2    9/2016  Pridoehl et al.
2012/0070619 A1*  3/2012  Mikulak ................ B33Y 70/00
                                       428/156
(Continued)

FOREIGN PATENT DOCUMENTS

JP    2016-501136    1/2016
JP    3204870        6/2016
(Continued)

OTHER PUBLICATIONS

Chinese Office Action and Search Report for Chinese Patent Application No. 201810172478.0 dated Sep. 27, 2019.
(Continued)

*Primary Examiner* — Joseph S Del Sole
*Assistant Examiner* — Jamel M Nelson
(74) *Attorney, Agent, or Firm* — Amin, Turocy & Watson, LLP

(57) ABSTRACT

A three-dimensional printing method includes a filament forming step, and a laminating step in order to laminate filaments possessing thermoplasticity and thereby obtain a three-dimensional modeled object. In the filament forming step, a coating material made of a thermoplastic resin, which is plasticized by heating, is adhered to at least a part of an outer circumferential surface of a core material, which is made of a thermoplastic resin having a lower temperature than that of the plasticized coating material, thereby obtaining the filaments. In the laminating step, the filaments, which are made up from the plasticized coating material, and the core material that is plastically deformable but at a lower temperature than the plasticized coating material, are laminated while being pressed with respect to a portion to be laminated.

3 Claims, 6 Drawing Sheets

(51) Int. Cl.
*B29C 64/118* (2017.01)
*B33Y 80/00* (2015.01)
*B33Y 30/00* (2015.01)
*B33Y 70/00* (2020.01)
*B33Y 10/00* (2015.01)
*B29C 64/295* (2017.01)

(52) U.S. Cl.
CPC ............... *B33Y 10/00* (2014.12); *B33Y 30/00* (2014.12); *B33Y 70/00* (2014.12); *B33Y 80/00* (2014.12)

(56) References Cited

U.S. PATENT DOCUMENTS

| | | | |
|---|---|---|---|
| 2012/0231225 A1 | 9/2012 | Mikulak et al. | |
| 2016/0122541 A1* | 5/2016 | Jaker | B29C 64/307 264/219 |
| 2017/0210074 A1* | 7/2017 | Ueda | B33Y 80/00 |

FOREIGN PATENT DOCUMENTS

| | | |
|---|---|---|
| JP | 2016-193602 | 11/2016 |
| WO | 2015/182675 | 12/2015 |

OTHER PUBLICATIONS

Japanese Office Action for Japanese Patent Application No. 2017-037882 dated Jan. 22, 2019.

* cited by examiner

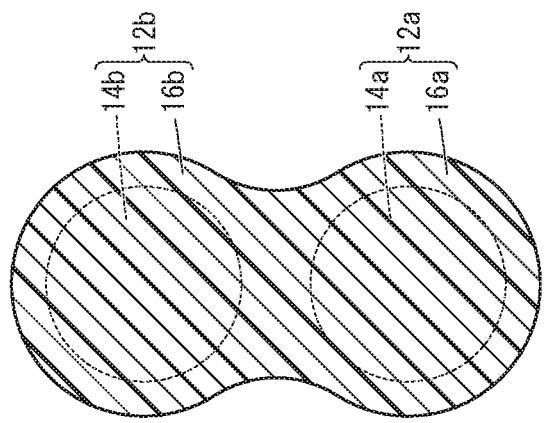
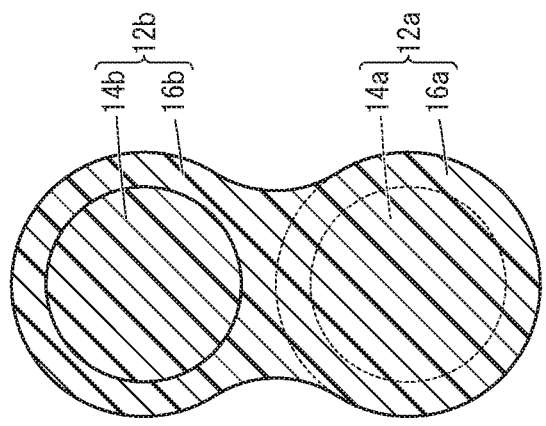
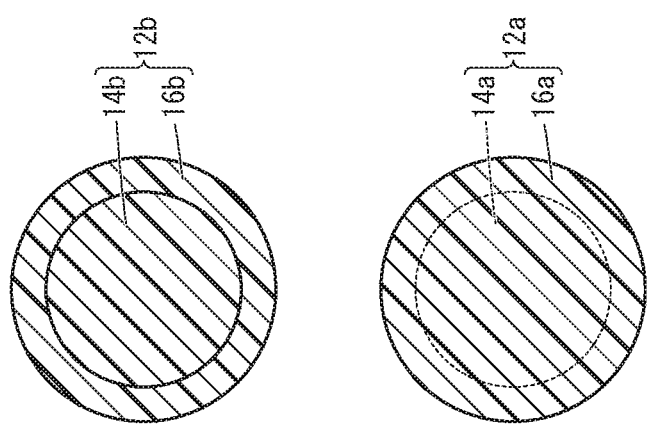

THREE-DIMENSIONAL PRINTING METHOD, THREE-DIMENSIONAL PRINTING APPARATUS, AND THREE-DIMENSIONAL MODELED OBJECT

CROSS-REFERENCE TO RELATED APPLICATION

This application is based upon and claims the benefit of priority from Japanese Patent Application No. 2017-037882 filed on Mar. 1, 2017, the contents of which are incorporated herein by reference.

BACKGROUND OF THE INVENTION

Field of the Invention

The present invention relates to a three-dimensional printing method, a three-dimensional printing apparatus, and a three-dimensional modeled object.

Description of the Related Art

As a three-dimensional printing method which enables a three-dimensional modeled object to be obtained at a low cost with a simple configuration, a so-called fused deposition modeling method is known, in which plasticized (melted) resin filaments are laminated so as to be formed in a desired shape, and the laminated structure is solidified while maintaining the shape thereof (see, for example, International Publication No. WO 2015/182675).

In this method, in order to increase production efficiency of such three-dimensional modeled objects, it may be considered to increase the diameter of a discharge member of the nozzle through which the filaments are discharged onto a portion to be laminated, or to increase the speed at which the nozzle is moved.

SUMMARY OF THE INVENTION

However, if the diameter of the discharge member of the nozzle is increased in order to increase manufacturing efficiency of the three-dimensional modeled objects, then the amount at which the plasticized filaments are supplied per unit time increases, but by this amount, the time required from the filaments being laminated onto the portion to be laminated and until solidification thereof occurs also increases.

Therefore, it is difficult to have solidification of the filaments follow with the speed at which the nozzle is moved, and there is a concern that deformations such as deflection and sagging may occur during the period until the filaments become solidified. Stated otherwise, it is difficult to laminate the filaments in a desired shape, or for the filaments to become solidified while maintaining the shape of the laminated filaments, and thereby obtain a three-dimensional modeled object. In addition, there is a concern that a deterioration in modeling accuracy of the three-dimensional modeled object may occur.

Further, due to an increase in the amount of plasticized filaments supplied per unit time, the amount of shrinkage upon solidification of the plasticized filaments also increases, and therefore, for this reason as well, a deterioration in modeling accuracy of the three-dimensional modeled object is likely to occur.

A principal object of the present invention is to provide a three-dimensional printing method which is superior both in terms of manufacturing efficiency and modeling accuracy.

Another object of the present invention is to provide a three-dimensional printing apparatus which is superior both in terms of manufacturing efficiency and modeling accuracy.

Another object of the present invention is to provide a three-dimensional modeled object which is superior both in terms of manufacturing efficiency and modeling accuracy.

According to one embodiment of the present invention, a three-dimensional printing method is provided for obtaining a three-dimensional modeled object by laminating filaments possessing thermoplasticity, comprising a filament forming step of adhering a coating material made of a thermoplastic resin, which is plasticized by heating, to at least a part of an outer circumferential surface of a core material, which is made of a thermoplastic resin having a lower temperature than that of the plasticized coating material, thereby forming the filaments, and a laminating step of pressing and laminating the filaments, which are made up from the plasticized coating material, and the core material that is plastically deformable but at a lower temperature than the plasticized coating material, with respect to a portion to be laminated.

First, in the three-dimensional printing method according to the present invention, filaments, which are made up from the coating material, which is plasticized by heating, and the core material that is plastically deformable but at a lower temperature than the plasticized coating material, are laminated and solidified to obtain a three-dimensional modeled object. In accordance with this feature, in comparison with a case in which plasticized filaments, all of which have been heated to a uniform temperature, are laminated and solidified, the core material is kept at a low temperature, or in other words, only the coating material is heated to a high temperature, and therefore, by such an amount, it is possible for the filaments to become solidified more rapidly. On the other hand, since the coating material can be sufficiently heated and plasticized, the coating material can be integrated suitably with the adjacent filament. More specifically, it is possible to shorten the time required for the plasticized filaments to solidify, while avoiding a deterioration in adhesiveness between the filaments.

As a result, solidification of the filaments easily follows with the speed at which the nozzle is moved, and the filaments can be laminated in a desired shape. Further, during the period until the filaments become solidified following lamination thereof, it is possible to suppress the occurrence of deformations such as deflection and sagging, and after solidification thereof, the filaments can suitably be adhered to each other. Furthermore, as described above, the amount of the plasticized portion that is heated to a high temperature can be reduced, and by this portion, the amount by which the filaments undergo contraction due to solidification thereof can be reduced.

Accordingly, in order to enhance production efficiency of such three-dimensional modeled objects, even if the amount at which the filaments are supplied per unit time with respect to the portion to be laminated is increased, or even if the movement speed (lamination speed) of the nozzle that supplies the filaments is increased, a deterioration in modeling accuracy can be avoided.

Secondly, in the three-dimensional printing method, when the filaments are laminated with respect to the portion to be laminated, the core material that constitutes the filaments is of a temperature at which plastic deformation thereof is possible, even while being at a lower temperature than that of the plasticized coating material. Therefore, the filaments which are made up from the core material and the coating material can be laminated while easily undergoing deformation, and even if the filaments are deformed in this manner, it is possible to avoid distortion or strain from remaining in the filaments. Moreover, the core material, which is of a temperature lower than the plasticized coating material, may be made to reach a temperature at which plastic deformation thereof is possible prior to adherence of the coating material thereon, or may be made to reach a temperature at which plastic deformation thereof is possible by depositing the plasticized coating material thereon and conducting heat therefrom.

Thirdly, in the three-dimensional printing method, the filaments are laminated while being pressed with respect to the portion to be laminated. In accordance with this feature, suitable contact can be brought about between the coating material and the portion to be laminated, as well as between the core material and the coating material, and conduction of heat can be promoted mutually therebetween. Therefore, the filaments can be solidified more rapidly.

As described above, according to the present invention, a three-dimensional modeled object can be obtained, which is superior both in terms of manufacturing efficiency and modeling accuracy. Further, the three-dimensional modeled object is excellent in quality, because the filaments are suitably adhered to each other, and distortion and strain accompanying formation thereof is prevented from remaining inside the filaments.

In the above-described three-dimensional printing method, in the laminating step, the filaments preferably are laminated with respect to the portion to be laminated using a nozzle configured to discharge the filaments, and the nozzle preferably is moved in a state in which a discharging direction of the filaments is inclined with respect to a stacking direction in which the filaments are laminated, in a manner so that the filaments are pressed from a front side in a direction of travel of the nozzle.

In this case, since it is possible to easily determine the posture and orientation at which the filaments are laminated with respect to the portion to be laminated, in conjunction with the fact that the filaments can be solidified quickly as noted above, it is possible to efficiently obtain three-dimensional modeled objects which are excellent in modeling precision, without using a jig or the like for supporting the laminated filaments.

Further, according to another embodiment of the present invention, a three-dimensional printing apparatus is provided, which is configured to obtain a three-dimensional modeled object by laminating filaments possessing thermoplasticity, comprising a nozzle including a coating material discharge member configured to discharge a coating material made of a thermoplastic resin plasticized by heating, and a core material discharge member configured to discharge a core material, which is made of a thermoplastic resin having a lower temperature than that of the plasticized coating material, the nozzle being configured to discharge onto a portion to be laminated the filaments, which are formed by adhering the coating material, which is discharged from the coating material discharge member, to at least a part of an outer circumferential surface of the core material which is discharged from the core material discharge member, and a moving device configured to move the nozzle in three dimensions, thereby to press and laminate the filaments, which are made up from the plasticized coating material, and the core material that is plastically deformable but at a lower temperature than the plasticized coating material, with respect to the portion to be laminated.

The three-dimensional printing apparatus according to the present invention is equipped with the nozzle that discharges the filaments made of the coating material plasticized by heating, and the core material, which is made of a thermoplastic resin having a lower temperature than that of the plasticized coating material, and the moving device, which by moving the nozzle in three dimensions, presses and laminates the filaments with respect to the portion to be laminated. More specifically, in accordance with the three-dimensional printing apparatus, since the three-dimensional printing method can be applied in the manner described above, three-dimensional modeled objects which are superior in terms of manufacturing efficiency and modeling accuracy, as well as being of high quality can be obtained.

In the above-described three-dimensional printing apparatus, the moving device preferably moves the nozzle in a state in which a discharging direction of the filaments is inclined with respect to a stacking direction in which the filaments are laminated, in a manner so that the filaments are pressed with respect to the portion to be laminated from a front side in a direction of travel of the nozzle.

In this case, it is possible to efficiently obtain three-dimensional modeled objects which are excellent in modeling precision, without using a jig or the like for supporting the laminated filaments.

In the above-described three-dimensional printing apparatus, the core material discharge member and the coating material discharge member preferably are of tubular shapes having different diameters from each other, and the coating material discharge member which is of a larger diameter preferably is disposed in covering relation to an outer circumferential surface of the core material discharge member which is of a smaller diameter, a reservoir portion in which the coating material is stored preferably is formed between an inner circumferential surface of the coating material discharge member and the outer circumferential surface of the core material discharge member, and a heat shielding portion preferably is disposed between the outer circumferential surface and the inner circumferential surface of the core material discharge member, and configured to suppress heat from the coating material stored in the reservoir portion so as not to be transmitted to the core material.

In this case, first, as described above, since the core material discharge member is disposed inside the coating material discharge member, it is possible to reduce the size of the three-dimensional printing apparatus.

Secondly, the reservoir portion is formed between the outer circumferential surface of the core material discharge member and the inner circumferential surface of the coating material discharge member, and the molten coating material can be stored in the reservoir portion. In accordance with this feature, it is possible to continuously and stably discharge the coating material from the coating material discharge member, and to efficiently form the filaments. In addition, stopping or restarting of discharging of the coating material can easily be controlled, and in turn, it is possible to easily control stopping or restarting of discharging of the filaments from the nozzle. Therefore, modeling accuracy of the three-dimensional modeled objects can be enhanced.

Thirdly, the heat shielding portion is provided between the outer circumferential surface and the inner circumferential surface of the core material discharge member, thereby suppressing heat from the coating material stored in the reservoir portion so as not to be transmitted to the core material in the core material discharge member. More specifically, even if the reservoir portion is formed in the manner described above, it is possible to prevent the temperature of the molten coating material from becoming lowered in the interior of the reservoir portion, and to avoid rising of the temperature of the core material inside the core material discharge member. Therefore, the filaments can be produced satisfactorily.

According to another embodiment of the present invention, a three-dimensional modeled object is provided, which is made up from laminated filaments of a thermoplastic resin, wherein the filaments are constituted from a core material, and a coating material adhered to at least a part of an outer circumferential surface of the core material, and the core materials of adjacent filaments are integrated with each other via the coating material.

Since the three-dimensional printing method and the three dimensional printing apparatus can be applied in the manner described above, the three-dimensional modeled object obtained thereby is superior in terms of manufacturing efficiency and modeling accuracy, as well as being of high quality.

The above and other objects, features, and advantages of the present invention will become more apparent from the following description when taken in conjunction with the accompanying drawings, in which preferred embodiments of the present invention are shown by way of illustrative example.

BRIEF DESCRIPTION OF THE DRAWINGS

FIGS. 6A to 6C are explanatory diagrams illustrating a filament laminating step.

DESCRIPTION OF THE PREFERRED EMBODIMENTS

Preferred embodiments of a three-dimensional printing method, a three-dimensional printing apparatus, and a three-dimensional modeled object according to the present invention will be described in detail below with reference to the accompanying drawings.

Figure 1:
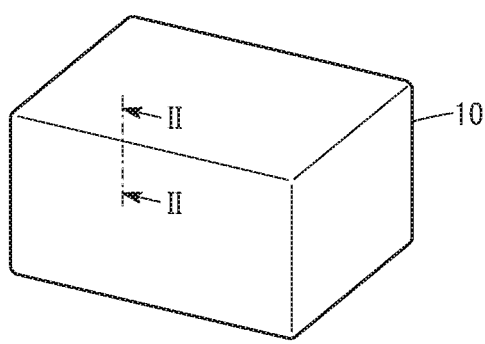
FIG. 1 is a schematic perspective view of a three-dimensional modeled object according to an embodiment of the present invention.
Figure 2:
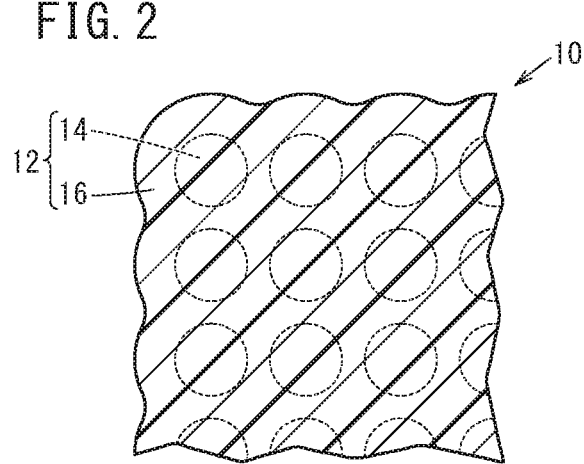
FIG. 2 is a cross-sectional view taken along line II-II of FIG. 1.

As shown in FIG. 1 and FIG. 2, a three-dimensional modeled object 10 according to the present embodiment is formed by integrating filaments 12 (see FIG. 2) which are laminated so as to be formed in a desired shape. Moreover, as shown in FIG. 1, according to the present embodiment, the three-dimensional modeled object 10 is a rectangular parallelepiped. However, the present invention is not limited to this feature, and the three-dimensional modeled object 10 may have various shapes depending on the intended usage thereof or the like.

The filaments 12, for example, are made of a thermoplastic resin such as acrylonitrile-butadiene-styrene (ABS) or polylactic acid (PLA), and as shown in FIG. 2, include a core material 14, and a coating material 16 that is adhered to the outer circumferential surface of the core material 14. Further, the core materials 14 of the adjacent filaments 12 are integrated with each other via the coating material 16. Moreover, the core material 14 and the coating material 16 may be constituted from different types of resins, or may be constituted from the same type of resin.

Figure 3:
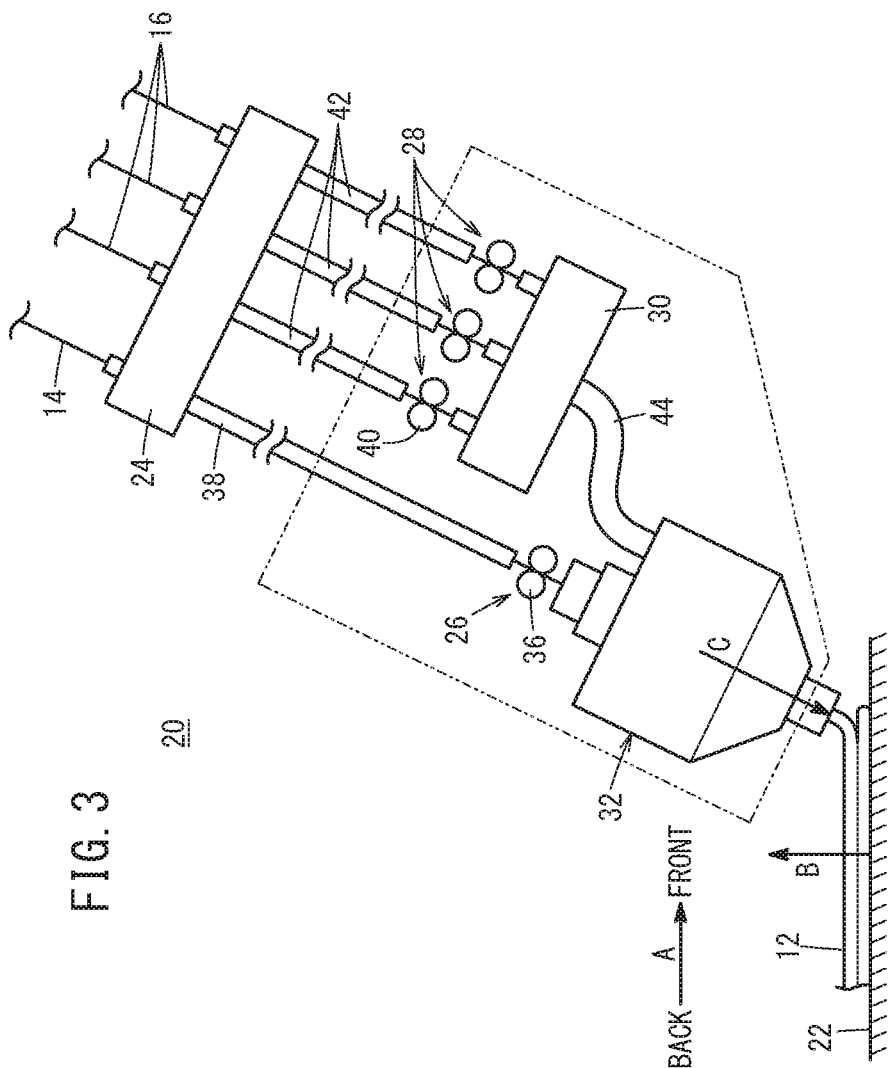
FIG. 3 is a schematic view of main components of a three-dimensional printing apparatus according to an embodiment of the present invention.

The three-dimensional modeled object 10 can be obtained, for example, by a three-dimensional printing method using a three-dimensional printing apparatus 20 shown in FIG. 3. In the three-dimensional printing apparatus 20 according to the present embodiment, the filaments 12 are formed using one strand of the core material 14 and three strands of the coating material 16, which are supplied respectively in the form of an elongate solid resin, and together therewith, the filaments 12 are laminated on a stage 22 to thereby manufacture a three-dimensional modeled object 10 (see FIG. 1). The number of strands of the coating material 16 that are used in forming the filaments 12 is not limited to three, and can be set appropriately depending on the diameter of the elongate solid resin coating material 16, the diameter of the filaments 12, and the like.

Figure 5:
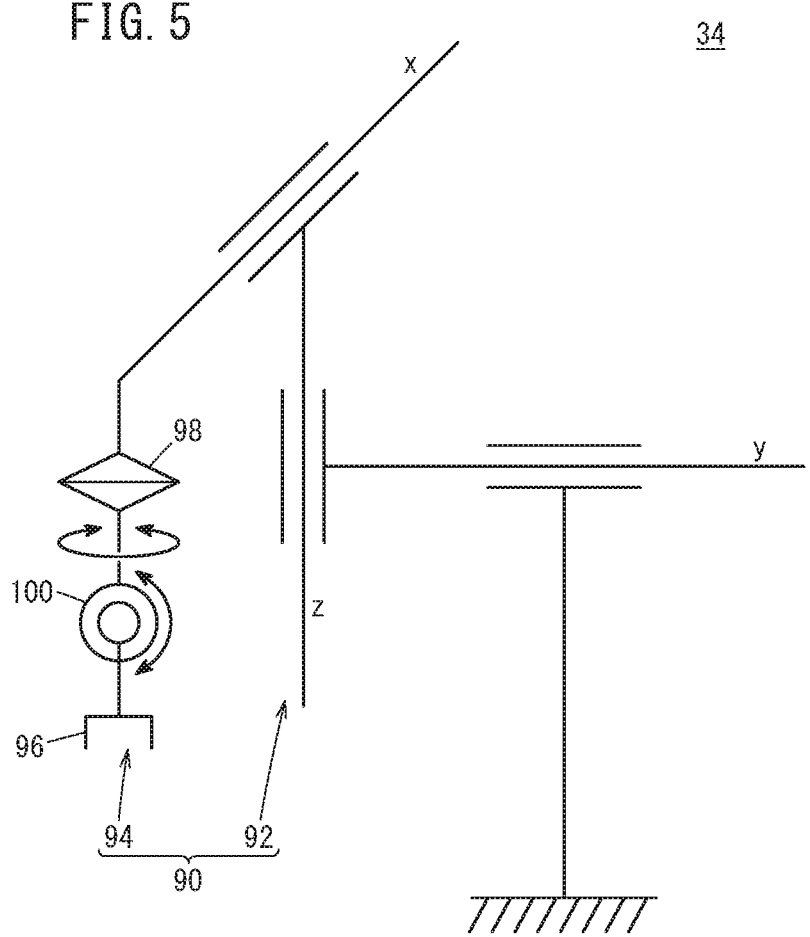
FIG. 5 is a symbolic diagram of a robot that constitutes a moving device of the three-dimensional printing apparatus.

More specifically, the three-dimensional printing apparatus 20 is primarily equipped with a core material heating device 24, a core material conveying device 26, coating material conveying devices 28, a coating material heating device 30, a nozzle 32, and a moving device 34 (see FIG. 5).

The core material heating device 24 is made up from a heater or the like that heats the core material 14, which is supplied in the form of an elongate solid resin, to a temperature lower than a temperature at which the coating material 16 is plasticized by heating the coating material 16 with the coating material heating device 30. For example, in the case that the core material 14 is made of ABS, the core material 14 may be heated to a temperature of roughly 160° C.

Further, as shown in FIG. 3, in addition to the core material 14, the core material heating device 24 may be supplied with the coating material 16 in the form of an elongate solid resin. In accordance with this feature, it is possible to supply the coating material 16, which has been preheated using the heat in the core material heating device 24, to the coating material heating device 30, and therefore, the coating material 16 can be heated efficiently.

The core material conveying device 26 includes, for example, a pair of drive rollers 36 disposed between the core material heating device 24 and the nozzle 32 in the vicinity of the nozzle 32, and a motor (not shown) for rotating the drive rollers 36. In a state with the core material 14 being sandwiched between the pair of drive rollers 36, the drive rollers 36 are rotated, whereby the core material 14 can be conveyed, so that the core material 14 passes through the core material heating device 24 and is supplied to the nozzle 32. Further, the drive rollers 36 are capable of being rotated in forward and reverse directions, and corresponding to the direction of rotation thereof, the core material 14 can be conveyed while being switched between a direction of being advanced toward the nozzle 32, and in a backward direction away from the nozzle 32.

A pipe 38 which is formed from a heat insulating material is disposed between the core material heating device 24 and the core material conveying device 26. The core material 14 which is discharged from the core material heating device 24 passes through the interior of the externally and thermally insulated pipe 38, and is conveyed to the nozzle 32 while the temperature thereof is maintained.

The coating material conveying devices 28 include, for example, respective pairs of drive rollers 40 disposed between the core material heating device 24 and the coating material heating device 30 in the vicinity of the coating material heating device 30, and motors (not shown) for rotating the drive rollers 40. A number of coating material conveying devices 28 (three in the present embodiment) corresponds to the number of strands of the coating materials 16 that are supplied to the core material heating device 24. The coating materials 16 pass through the core material heating device 24, and the coating materials 16 are conveyed respectively so as to be supplied to the coating material heating device 30. The drive rollers 40 are capable of being rotated in forward and reverse directions in the same manner as the drive rollers 36, and corresponding to the direction of rotation thereof, the coating materials 16 can be conveyed while being switched between a direction of being advanced toward the coating material heating device 30, and in a backward direction away from the coating material heating device 30.

Pipes 42, which are formed from a heat insulating material in the same manner as the pipe 38, are disposed between the core material heating device 24 and the coating material conveying devices 28, in a number corresponding to the number of strands (three in the present embodiment) of the coating material 16 supplied to the core material heating device 24. The coating materials 16 which are discharged from the core material heating device 24 pass through the interior of the externally insulated pipes 42, and are conveyed to the coating material heating device 30 while the temperature thereof is maintained.

The coating material heating device 30 is made up from a heater or the like for heating and plasticizing the coating material 16, and as noted above, the three strands of the coating material 16, which are preheated by the core material heating device 24, are made into a fluidic resin, and are discharged to a communicating pipe 44 that communicates with the coating material heating device 30 and the nozzle 32.

Figure 4:
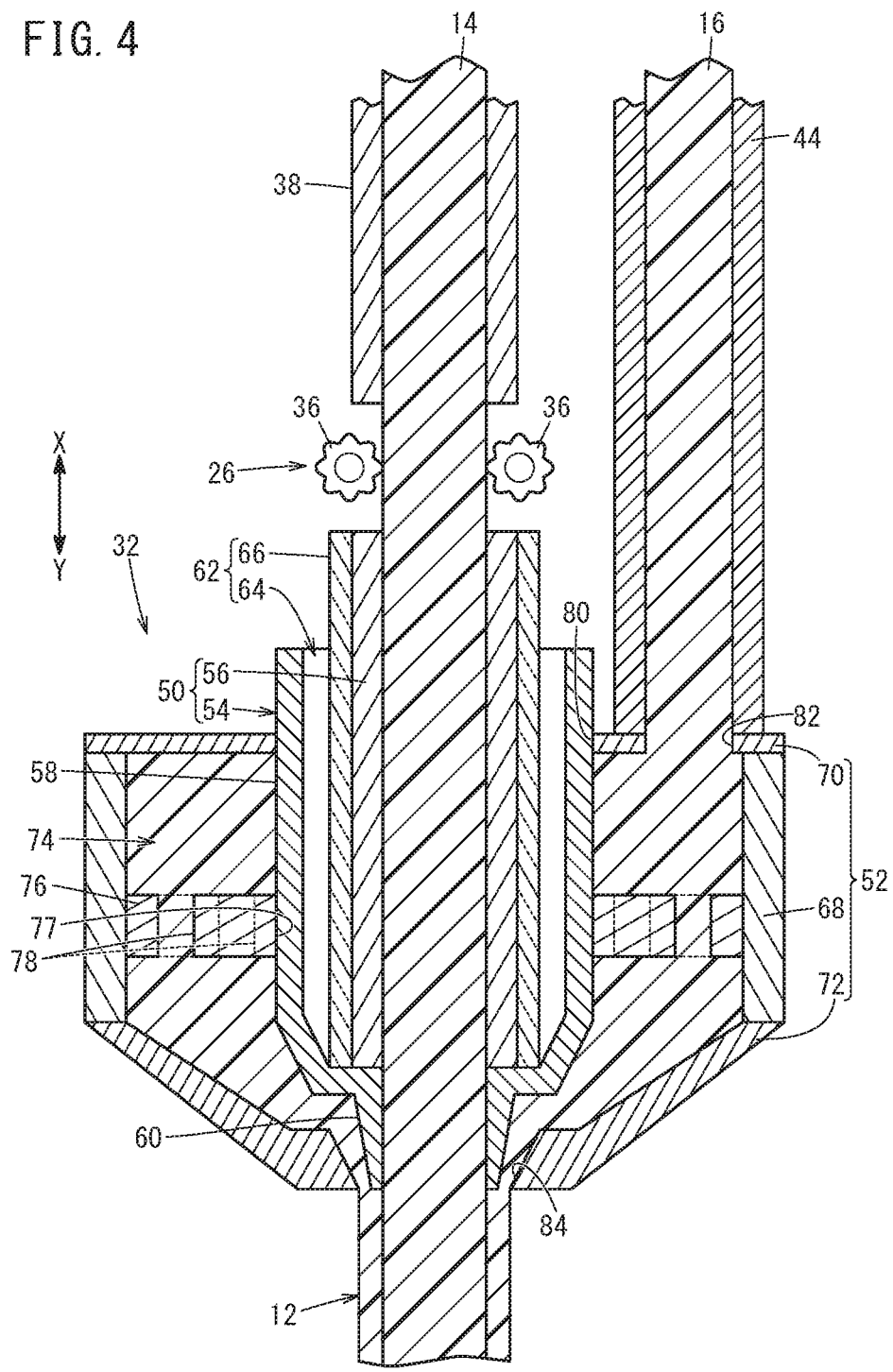
FIG. 4 is a cross-sectional view of a nozzle of the three-dimensional printing apparatus shown in FIG. 3.

The nozzle 32 discharges the filaments 12 toward the stage 22. More specifically, as shown in FIGS. 3 and 4, the nozzle 32 includes a core material discharge member 50 through which the core material 14 heated by the core material heating device 24 is discharged, and a coating material discharge member 52 through which the coating material 16, which has been plasticized by the coating material heating device 30, is discharged.

The core material discharge member 50 has a main pipe 54 and a heat insulating pipe 56. The main pipe 54 includes a large diameter portion 58 provided on a proximal end side (the side in the direction of the arrow X of FIG. 4) to which the core material 14 is supplied, and a small diameter portion 60, which is provided on a distal end side (the side in the direction of the arrow Y of FIG. 4) that discharges the core material 14, and is smaller in diameter than the large diameter portion 58. The distal end side of the large diameter portion 58 is tapered in diameter toward the small diameter portion 60. Further, a step is formed between the distal end of the large diameter portion 58 and the proximal end of the small diameter portion 60, on the basis of a mutual diametrical difference therebetween.

The heat insulating pipe 56 is formed from a heat insulating material, and the inner diameter thereof is substantially equivalent to the inner diameter of the small diameter portion 60 of the main pipe 54, whereas the outer diameter thereof is smaller than the inner diameter of the large diameter portion 58. As described above, the heat insulating pipe 56 is disposed inside the large diameter portion 58, so that an end surface on the distal end side thereof abuts against the stepped surface formed between the large diameter portion 58 and the small diameter portion 60.

A heat shielding portion 62 is provided between the main pipe 54 and the heat insulating pipe 56. The heat shielding portion 62 is constituted from a space 64 formed between the large diameter portion 58 and the heat insulating pipe 56, and a heat insulating material 66 or the like provided in the space 64, and which functions to provide heat shielding between the interior and the exterior of the core material discharge member 50. Further, the heat shielding portion 62 may further include, for example, a coolant circulating mechanism (not shown), which enables a coolant such as air or the like to flow through the space 64. In this case, it is possible to more suitably provide heat shielding between the interior and the exterior of the core material discharge member 50.

The coating material discharge member 52 includes a reservoir tube 68, a lid member 70 that closes an opening on a proximal end side of the reservoir tube 68, and a tapered portion 72 disposed on the distal end side of the reservoir tube 68.

The reservoir tube 68 is formed of a heat insulating material. An inner diameter of the reservoir tube 68 is larger than the outer diameter of the large diameter portion 58 of the main pipe 54, and is arranged so as to cover an outer circumferential surface excluding a portion on the proximal end side of the large diameter portion 58. More specifically, between the inner circumferential surface of the reservoir tube 68 and the outer circumferential surface of the large diameter portion 58, a reservoir portion 74 is formed in which the plasticized coating material 16 is capable of being stored.

As shown in FIG. 4, a disk member 76 may be disposed in the reservoir portion 74. The disk member 76 is formed with an insertion hole 77 through which the main pipe 54 is inserted substantially in the center in a diametrical direction, together with a plurality of through holes 78 that penetrate along the thickness direction more on an outer circumferential side than the insertion hole 77. The plasticized coating material 16 flows via the through holes 78 from the proximal end side toward the distal end side of the reservoir portion 74, whereby the pressure and temperature of the coating material 16 can be equalized.

The lid member 70 is formed with an insertion hole 80 through which a proximal end side of the main pipe 54 is inserted substantially in the center in a diametrical direction, together with a supply port 82 to which the communicating pipe 44 is connected more on an outer circumferential side than the insertion hole 80. The plasticized coating material 16 is supplied to the reservoir portion 74 via the supply port 82.

The tapered portion 72 extends from the reservoir tube 68 while becoming reduced in diameter toward the distal end side. A discharge port 84, which is capable of discharging the coating material 16 inside the reservoir portion 74, is formed at the distal end of the tapered portion 72. The inner diameter of the discharge port 84 is greater than the outer diameter of the distal end side of the small diameter portion 60, and the distal end side of the small diameter portion 60 is disposed inside the discharge port 84.

More specifically, the nozzle 32, which is configured in the manner described above, discharges the core material 14 having a lower temperature than the plasticized coating material 16 from the distal end side of the small diameter portion 60, and together therewith, discharges the plasticized coating material 16 from the discharge port 84 of the tapered portion 72. Consequently, it is possible for the filaments 12 to be formed and discharged in which the plasticized coating material 16 is adhered to the outer circumferential surface of the core material 14, which is plastically deformable but at a lower temperature than that of the plasticized coating material 16.

Moreover, according to the present embodiment, a description has been given in which, by disposing the discharge port 84 and the small diameter portion 60 so that the axial centers thereof coincide with each other, the filaments 12 are formed in which the coating material 16 is adhered so as to have a uniform thickness in the circumferential direction around the entire outer circumferential surface of the core material 14. However, the present invention is not particularly limited to this feature. For example, by shifting the axial centers of the discharge port 84 and the small diameter portion 60, it is also possible to adjust the relative positioning therebetween, in a manner so that the core material 14 and the coating material 16 are arranged eccentrically.

Further, as described above, in the nozzle 32, the core material discharge member 50 is disposed inside the coating material discharge member 52. Therefore, for example, compared with a case in which the core material discharge member 50 and the coating material discharge member 52 are arranged side by side, it is possible to reduce the size of the nozzle 32. Thus, it is possible to reduce the size and scale of the three-dimensional printing apparatus 20 as a whole.

In the case that the filament 12 is continuously discharged from the nozzle 32, the respective drive rollers 36, 40 of the core material conveying device 26 and the coating material conveying devices 28 may be continuously rotated in one direction. On the other hand, in the case that discharging of the filament 12 from the nozzle 32 is to be halted, rotation of the respective drive rollers 36, 40 may be stopped. In this case, concerning the drive rollers 40 of the coating material conveying devices 28, by temporarily rotating the drive rollers 40 in the other direction and then stopping them, any concern over the plasticized coating material 16 being excessively discharged from the coating material discharge member 52 can be dispensed with. In addition, the nozzle 32 may be provided with a freely openable and closeable lid (not shown), which closes both the distal end side of the small diameter portion 60 and the discharge port 84, or only the discharge port 84.

As shown schematically using the symbolic diagram of FIG. 5, the moving device 34 includes a robot 90 and a control unit (not shown). The robot 90 includes a main body portion 92 operated on the basis of a three-dimensional orthogonal coordinate system, and an articulated arm 94 attached to the main body portion 92. The arm 94 comprises a first joint 98 and a second joint 100 provided in this order from a proximal end toward a wrist 96 of the arm 94. The core material conveying device 26, the coating material conveying devices 28, the coating material heating device 30, and the nozzle 32 (the constituent elements surrounded by the two-dot-dashed line in FIG. 3, referred to collectively as the nozzle 32, etc.) are fixed to the wrist 96.

By driving the robot 90 under the control of the control unit, the moving device 34 is capable of moving the nozzle 32, etc., in three dimensions with respect to the stage 22. At this time, because the nozzle 32 is reduced in size and scale as described above, it is possible to easily move the nozzle 32, etc., with high accuracy by the moving device 34.

The three-dimensional printing apparatus 20 according to the present embodiment is basically configured in the manner described above. Hereinafter, a three-dimensional printing method according to the present embodiment will be described in relation to operations of the three-dimensional printing apparatus 20.

By driving the core material conveying device 26 and the coating material conveying devices 28, the elongate solid resin core material 14 and the coating material 16 are continuously supplied to the core material heating device 24. Consequently, the core material 14 and the coating material 16 are heated to a temperature lower than the temperature at which the coating material 16 is plasticized by heating the coating material 16 with the coating material heating device 30.

Among the coating material 16 and the core material 14 which have been heated by the core material heating device 24, the coating material 16 is supplied to the coating material heating device 30 via the pipes 42. In addition, the coating material 16, which is plasticized in the coating material heating device 30 and has become a fluidic resin, is supplied to the coating material discharge member 52 of the nozzle 32 via the communicating pipe 44, and is stored in the reservoir portion 74.

On the other hand, the core material 14 is supplied to the core material discharge member 50 of the nozzle 32 via the pipe 38. In the core material discharge member 50, the core material 14 passes through the interior of the heat insulating pipe 56 of the core material discharge member 50, which is thermally insulated from the exterior by the heat shielding portion 62, etc. Therefore, as described above, in the reservoir portion 74, which is formed between the outer circumferential surface of the main pipe 54 of the core material discharge member 50 and the inner circumferential surface of the reservoir tube 68 of the coating material discharge member 52, it is possible to suppress the heat of the coating material 16 so as not to be transferred to the core material 14, even if the melted high temperature coating material 16 is stored therein.

Further, the core material discharge member 50 discharges the core material 14, which is heated to a temperature that is lower than the plasticized coating material 16, from the small diameter portion 60. On the other hand, in the coating material discharge member 52, the coating material 16 which has been plasticized sufficiently is discharged from the discharge port 84, and the coating material 16 is adhered to the outer circumferential surface of the core material 14 that is discharged from the small diameter portion 60. Owing thereto, the filaments 12 can be discharged from the nozzle 32. Stated otherwise, the filament forming step of the three-dimensional printing method according to the present embodiment is performed.

According to the present embodiment, as described above, the reservoir portion 74, which is capable of storing a predetermined amount of the coating material 16, is interposed between the coating material heating device 30 and the discharge port 84. Consequently, the coating material 16 can be continuously and stably discharged from the discharge port 84, and the filaments 12 can be obtained in an efficient manner. Further, stopping or restarting of discharging of the coating material 16 from the coating material discharge member 52 can easily be controlled, and in turn, it is possible to easily control stopping or restarting of discharging of the filaments 12 from the nozzle 32.

The filaments 12, which are formed in the manner described above, are discharged from the nozzle 32, and together therewith, the nozzle 32, etc., are moved in three dimensions by the moving device 34. At this time, the coating material 16 that makes up the filaments 12 is in a plasticized state, whereas the core material 14 is capable of being plastically deformed, but is at a lower temperature than that of the plasticized coating material 16. Consequently, the filaments 12 are laminated while being pressed against the portion to be laminated on the stage 22. Stated otherwise, the laminating step of the three-dimensional printing method according to the present embodiment is performed.

Moreover, the core material 14, which is of a temperature lower than the plasticized coating material 16, may be made to reach a temperature at which plastic deformation thereof is possible at a stage prior to the coating material 16 being adhered thereto, or stated otherwise, by being heated in the core material heating device 24. Alternatively, the core material 14 may be made to reach a temperature at which plastic deformation thereof is possible by depositing the plasticized coating material 16 thereon and conducting heat therefrom. More specifically, before and immediately after the coating material 16 is adhered to the core material 14, the temperature of the core material 14 may or may not have reached the temperature at which plastic deformation thereof is possible. When the filaments 12 are laminated onto the portion to be laminated, it is sufficient insofar as the core material 14 that constitutes the filaments 12 is of a temperature at which plastic deformation thereof is possible, even while being at a lower temperature than that of the plasticized coating material 16.

As shown in FIG. 3, the moving device 34 preferably places the filament 12 in a state in which a discharging direction (the direction of the arrow C) of the filaments 12 is inclined with respect to a stacking direction (the direction of the arrow B) in which the filaments 12 are laminated, in a manner so that the filaments 12 are pressed from a front side in a direction of travel (the direction of the arrow A) of the nozzle 32, etc. The reasons for this feature will be described later.

As to the portion to be laminated, in the case that the filament 12, which is discharged from the nozzle 32, is the first layer that is to be stacked on the stage 22, the portion to be laminated is placed at a predetermined position of the stage 22. Further, in the case that the filament 12, which is discharged from the nozzle 32, is a second or subsequent layer to be stacked on the previously laminated filament 12, the portion to be laminated is placed at a predetermined position of the previously laminated filament 12.

FIGS. 6A to 6C are explanatory diagrams for explaining the process of laminating the filaments 12, and more specifically, are cross-sectional views showing a previously laminated filament 12a, and a filament 12b for which a portion to be laminated is on the filament 12a.

As shown in FIG. 6A, the filament 12b immediately after being discharged from the nozzle 32 is in a state in which a plasticized coating material 16b is adhered to the outer circumferential surface of the core material 14b, which is at a lower temperature than that of the coating material 16b. As shown in FIG. 6B, when the filament 12b is pressed and laminated with respect to the previously laminated filament 12a, the coating material 16b flows so as to fill the space between the filament 12b and the filament 12a. In this state, by the coating material 16b becoming solidified, as shown in FIG. 6C, the filament 12a and the filament 12b can be integrated via coating materials 16a, 16b.

Moreover, in FIGS. 6A to 6C, an aspect is shown in which the filaments 12a, 12b, which are of a state in which core materials 14a, 14b and the coating materials 16a, 16b are disposed so as to be concentric with each other, or in other words, a state in which the coating materials 16a, 16b are adhered with a uniform thickness in the circumferential direction around the entire outer circumferential surface of the core materials 14a, 14b, are laminated on each other and integrated. However, it is a matter of course that the relative positioning of the coating materials 16a, 16b with respect to the core materials 14a, 14b, as well as the shape of the coating materials 16a, 16b may assume various forms, depending on the gravity applied to the filaments 12a, 12b, the viscosity of the plasticized coating materials 16a, 16b, and the like. The filament 12a and the filament 12b can be integrated together by at least allowing the coating material 16b to become solidified, in a state in which the coating material 16b is interposed between the core material 14a and the core material 14b.

The three-dimensional modeled object 10 can be obtained by repeatedly performing the aforementioned filament forming step and the laminating step, and stacking all of the necessary amount of the filaments 12, including the filaments 12a, 12b, so as to form a desired shape, and then allowing the filaments 12 to solidify.

More specifically, in the three-dimensional printing method, the filaments 12, which are made up from the coating material 16, which is plasticized by heating, and the core material 14 that is plastically deformable but at a lower temperature than the plasticized coating material 16, are laminated and solidified to obtain the three-dimensional modeled object 10. In accordance with this feature, for example, in comparison with a case in which plasticized filaments, all of which have been heated to a uniform temperature, are laminated and solidified, the core material 14b is kept at a low temperature, or in other words, only the coating material 16b is heated to a high temperature, and therefore, by such an amount, it is possible for the filament 12b to become solidified more rapidly.

On the other hand, since the coating material 16b can be sufficiently heated and plasticized, the coating material 16b can be integrated suitably with the adjacent filament 12a. Stated otherwise, it is possible to shorten the time required for the plasticized filament 12b to solidify, while avoiding a deterioration in adhesiveness between the filaments 12a, 12b.

As a result, solidification of the filament 12b easily follows with the speed at which the nozzle 32 is moved, and all of the filaments 12, including the filaments 12a, 12b, can be laminated in a desired shape. Further, during the period until the filaments 12 become solidified following lamination thereof, it is possible to suppress the occurrence of deformations such as deflection and sagging, and after solidification thereof, the filaments 12 can suitably be adhered to each other. Furthermore, as described above, the amount of the plasticized portion that is heated to a high temperature can be reduced, and by this portion, the amount by which the filaments 12 undergo contraction due to solidification thereof can be reduced.

Accordingly, in order to enhance production efficiency of such three-dimensional modeled objects 10, even if the amount at which the filaments 12 are supplied per unit time with respect to the portion to be laminated, or even if the movement speed (lamination speed) of the nozzle 32 that supplies the filaments 12 is increased, a deterioration in modeling accuracy can be avoided.

Further, in the three-dimensional printing method, when the filaments 12 are laminated with respect to the portion to be laminated, the core material 14 that constitutes the filaments 12 is of a temperature at which plastic deformation thereof is possible. Therefore, even with the core material 14 being at a temperature lower than that of the plasticized coating material 16, the filaments 12 can be laminated while easily undergoing deformation, and even if the filaments 12 are deformed in this manner, it is possible to avoid distortion or strain from remaining inside the filaments 12.

Furthermore, in the three-dimensional printing method, the filaments 12 are laminated while being pressed with respect to the portion to be laminated. In accordance with this feature, suitable contact can be brought about between the coating material 16 and the portion to be laminated, as well as between the core material 14 and the coating material 16, and conduction of heat can be promoted mutually therebetween. Therefore, the filaments 12 can be solidified more rapidly.

In the foregoing manner, when the filaments 12 are laminated, as described above, by moving the nozzle 32 in a state in which the filaments 12 are inclined in a manner so as to be pressed from the front side in the direction of travel of the nozzle 32, the posture and orientation in which the filaments 12 are laminated can easily be determined. Therefore, along with enabling the filaments 12 to be quickly solidified, it is possible to efficiently obtain three-dimensional modeled objects 10 which are excellent in modeling precision, without using a jig or the like for supporting the laminated filaments 12.

As discussed above, according to the three-dimensional printing method in which the three-dimensional printing apparatus 20 according to the present embodiment is used, it is possible to obtain three-dimensional modeled objects 10 which are superior both in terms of manufacturing efficiency and modeling accuracy. Further, the three-dimensional modeled objects 10 are excellent in quality, because the filaments 12 are suitably adhered to each other, and distortion and strain accompanying formation thereof is prevented from remaining inside the filaments 12.

The present invention is not particularly limited to the above-described embodiments, and various modifications are possible without departing from the essence and gist of the present invention.

With the three-dimensional printing method according to the above-described embodiment, by the coating material 16 being adhered to the entire outer circumferential surface of the core material 14 with a uniform thickness in the circumferential direction, the filaments 12 are formed in which the cylindrical core material 14 and the annular coating material 16 are arranged concentrically. However, the present invention is not particularly limited to this feature.

For example, the filaments 12 may be formed by adhering the coating material 16 only to a part of the outer circumferential surface of the core material 14, and the part to which the coating material 16 of the filament 12 is adhered may be laminated while being pressed with respect to the portion to be laminated. In this case, as compared to the case in which the coating material 16 is adhered to the entire outer circumferential surface of the core material 14, it is possible to reduce the amount of coating material 16 required to form the filaments 12, and the filaments 12 can be solidified more rapidly.

Further, with the three-dimensional printing apparatus 20 according to the above-described embodiment, the core material discharge member 50 and the coating material discharge member 52 are of tubular shapes having different diameters from each other, and the coating material discharge member 52 which is larger in diameter is arranged in covering relation to the outer circumferential surface of the core material discharge member 50 which is smaller in diameter. However, the present invention is not particularly limited to this feature. In particular, in the case that the filaments 12 are formed by the coating material 16 being adhered only to a part of the outer circumferential surface of the core material 14, the core material discharge member 50 and the coating material discharge member 52 may be arranged side by side.

Furthermore, in the three-dimensional modeled object 10, which is obtained by laminating and solidifying the filaments 12 in which the coating material 16 is adhered only to a part of the outer circumferential surface of the core material 14, the coating material 16 may be interposed only between the core materials of adjacent filaments. Stated otherwise, unlike the three-dimensional modeled object 10 according to the above-described embodiment in which the entire outer peripheral surface of the core material 14 is covered by the coating material 16, a part may be provided where the outer circumferential surface of the core material 14 is exposed from the coating material 16.

With the three-dimensional printing apparatus 20 according to the above-described embodiment, the filaments 12 are formed by using the coating material 16, which is supplied in the form of an elongate solid resin. However, the coating material 16 may be supplied in any of various conditions. For example, the coating material 16 may be supplied under a condition in which the solid resin is in the form of pellets. In this case, as the coating material heating device that plasticizes the coating material 16, for example, a configuration can be adopted which is similar to that of a cylinder that constitutes a general type of injection molding machine.

Although the moving device 34 is equipped with the robot 90 shown in FIG. 5, the moving device 34 is not particularly limited, and insofar as it is capable of moving the nozzle 32, etc., in three dimensions with respect to the stage 22, a variety of configurations can be adopted therefor.

What is claimed is:

1. A three-dimensional printing apparatus configured to obtain a three-dimensional modeled object by laminating filaments possessing thermoplasticity, comprising:

a coating material heating device configured to heat a coating material made of a thermoplastic resin to a first temperature, a core material heating device configured to heat a core material made of a thermoplastic resin to a second temperature that is lower than the first temperature, a nozzle including a coating material discharge member configured to discharge the coating material, and a core material discharge member configured to discharge the core material, the nozzle being configured to discharge the filaments onto a portion on which the filaments are to be laminated, the filaments being formed by adhering the coating material, which is discharged from the coating material discharge member, to at least a part of an outer circumferential surface of the core material which is discharged from the core material discharge member; and a moving device configured to move the nozzle in three dimensions, thereby to allow the nozzle to press the filaments, which are made up from the coating material plasticized, and the core material plasticized but deformable and having a lower temperature than the plasticized coating material, against the portion on which the filaments are to be laminated and laminate the filaments on the portion on which the filaments are to be laminated.

2. The three-dimensional printing apparatus according to claim 1, wherein the moving device moves the nozzle in a state in which a discharging direction of the filaments is inclined with respect to a stacking direction in which the filaments are laminated, in a manner so that the filaments are pressed against the portion on which the filaments are to be laminated from a front side in a direction of travel of the nozzle.

3. The three-dimensional printing apparatus according to claim 1, wherein:
  the core material discharge member and the coating material discharge member are of tubular shapes having different diameters from each other, and the coating material discharge member which is of a larger diameter is disposed in covering relation to an outer circumferential surface of the core material discharge member which is of a smaller diameter;
  a reservoir portion in which the coating material is stored is formed between an inner circumferential surface of the coating material discharge member and the outer circumferential surface of the core material discharge member; and
  a heat shielding portion is disposed between the outer circumferential surface and the inner circumferential surface of the core material discharge member, and configured to suppress heat from the coating material stored in the reservoir portion so as not to be transmitted to the core material.

* * * * *